United States Patent [19]
Wycoff

[11] 3,828,272
[45] Aug. 6, 1974

[54] TONE GENERATOR FOR SELECTIVE CALL TRANSMITTER

[76] Inventor: Keith H. Wycoff, P.O. Box 308, Lexington, Nebr. 68850

[22] Filed: Nov. 15, 1972

[21] Appl. No.: 306,859

[52] U.S. Cl. ............... 331/40, 325/392, 331/117 R, 331/181
[51] Int. Cl. ............................................ H03b 21/00
[58] Field of Search ............ 331/37, 40, 42; 325/64, 325/155; 340/171

[56] References Cited

UNITED STATES PATENTS

| | | | |
|---|---|---|---|
| 2,363,835 | 11/1944 | Crosby | 331/37 X |
| 3,188,578 | 6/1965 | Winsor | 331/40 X |
| 3,419,815 | 12/1968 | Porter | 331/40 |
| 3,421,106 | 1/1969 | Garber et al | 331/40 |

*Primary Examiner*—Herman Karl Saalbach
*Assistant Examiner*—Siegfried H. Grimm
*Attorney, Agent, or Firm*—Prangley, Dithmar, Vogel, Sandler & Stotland

[57] ABSTRACT

The tone generator includes a first oscillator to generate a first signal of a fixed frequency and a second oscillator which is variable to generate a second signal of a selected frequency. A multiplier receives the signals and provides a pair of tones having frequencies respectively equal to the sum of and difference between their frequencies. A switch may be provided so that both inputs to the multiplier are received from the variable frequency oscillator, in which case the output of the multiplier will be a single tone having a frequency twice that of the signal produced by the variable frequency oscillator. In either event, the tones are modulated on an RF wave.

5 Claims, 5 Drawing Figures

TONE GENERATOR FOR SELECTIVE CALL TRANSMITTER

The present invention is directed to a tone generator and particularly to a tone generator used in a single side-band selective call transmitter.

It is an important object of the present invention to provide a tone generator for use in a selective call transmitter, which achieves maximum utilization of the available frequency spectrum.

Another object is to provide an encoder which can supply the tones either for a single side-band transmitter or for AM or FM transmitters.

A still further object of the invention is to provide an encoder which can selectively furnish pairs of tones for use in a single side-band system or alternatively single tones for use in a AM or FM system, with one set of corresponding decoders for the receivers.

In summary there is provided a tone generator for use in a selective call transmitter having an associated pass band, the tone generator comprising fixed frequency first oscillator means for producing a first signal of a fixed frequency approximately centered in the pass band, variable frequency second oscillator means for producing a second signal having a frequency less than the center frequency minus the lowest frequency of the pass band, and multiplier means having first and second inputs respectively coupled to the first and second oscillator means for producing first and second tones having frequencies in the pass band and respectively equal to the sum of and difference between the frequencies of the first and second signals.

The generator may include switching means having a first position coupling the first oscillator means to one input of the multiplier means and having a second position coupling the second oscillator means to that input, the other input of the multiplier means being coupled to the second oscillator means, whereby the multiplier produces first and second tones having frequencies respectively equal to the sum of and difference between the frequencies of the first and second signals when the switching means is in the first position thereof, and whereby the multiplier means produces a single tone having a frequency equal to twice the frequency of the first signal when the switching means is in the second position thereof.

With the foregoing and other objects in view, which will appear as the description proceeds, the invention consists of certain novel features and a combination of parts hereinafter fully described, illustrated in the accompanying drawings, and particularly pointed out in the appended claims, it being understood that various changes in the details of the circuitry may be made without departing from the spirit or sacrificing any of the advantages of the invention.

For the purpose of facilitating an understanding of the invention, there is illustrated in the accompanying drawings a preferred embodiment thereof, from an inspection of which, when considered in connection with the following description, the invention, its mode of construction, assembly and operation, and many of its advantages should be readily understood and appreciated.

Figures 1, 2:
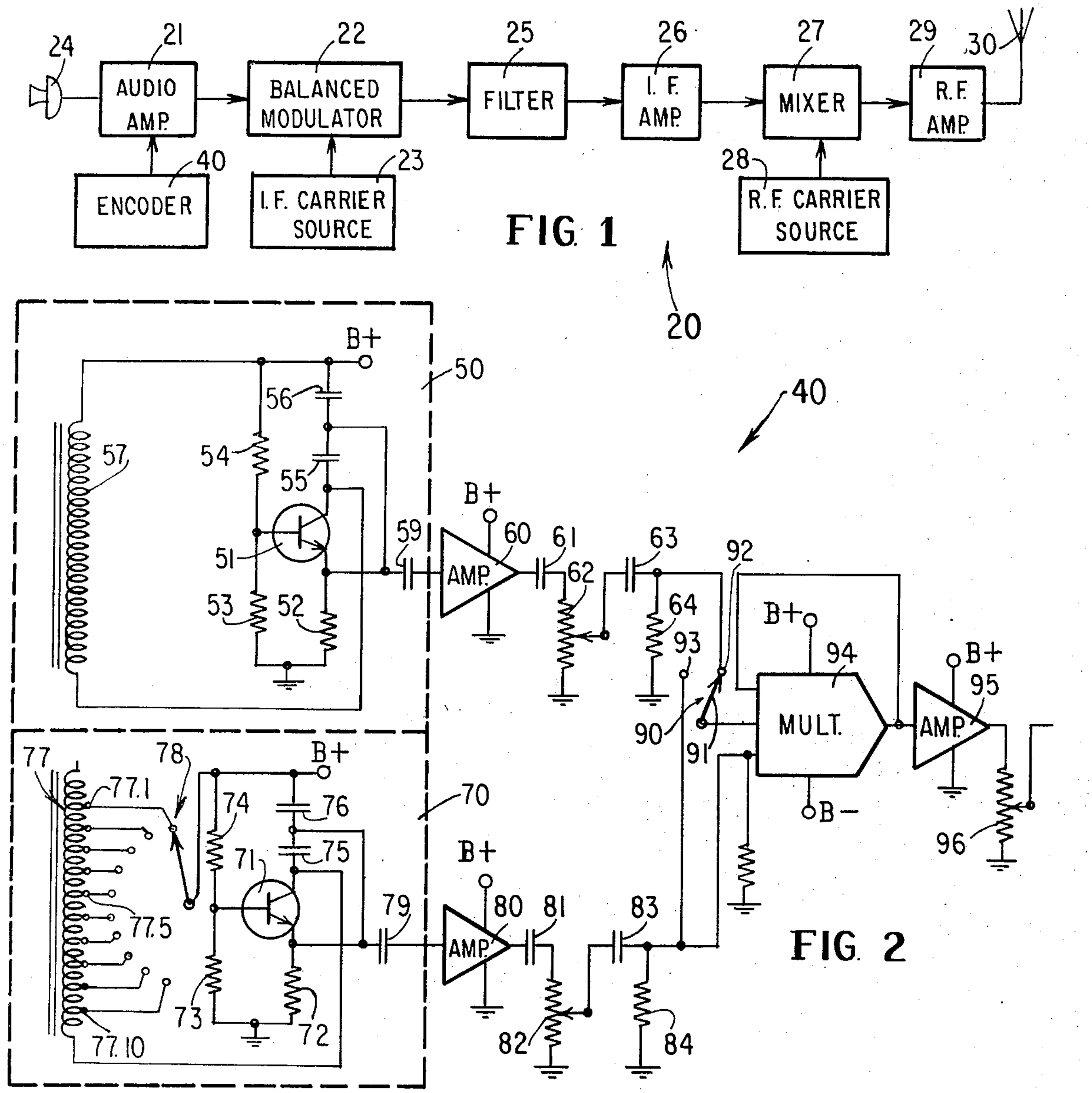
FIG. 1 illustrates a transmitter in block, used in a communication system incorporating the features of the present invention.
FIG. 2 is a diagram partially in block and partially in schematic of the encoder of FIG. 1.

Referring now to the drawings, and more particularly to FIG. 1 thereof, there is shown a single side-band transmitter 20 for transmitting single side-band signals with a suppressed carrier. The transmitter 20 includes an audio amplifier 21 for applying an audio signal to a balanced modulator 22, the modulator 22 having a second input to which is applied an IF carrier from an IF carrier source 23. The balanced modulator 22 mixes the audio signal (the modulation frequencies) and the IF carrier wave, to provide an output signal having components with frequencies equal to the sum and difference of the frequencies of the input waves. The modulation frequencies are attenuated substantially because of the band-pass characteristics of the modulator 22, and the carrier wave is balanced off electronically. The modulation components may either be in the form of a voice message applied to the audio amplifier 21 by way of the microphone 24 or from an encoder 40 to be described in detail hereinafter.

The upper and lower side bands produced in the balanced modulator are applied to a filter 25 which passes only a selected one of the side bands, the selected side band being amplified in an IF amplifier 26. The amplified IF signals are applied to a mixer 27 which also receives a higher frequency, RF carrier wave from an RF carrier source 28, thereby to provide a modulated signal at radio frequencies. The RF signal is amplified in an RF amplifier 29 and is radiated by an antenna 30. The elements just described are elements well known in the art, so that further description thereof is unnecessary. Also, it is to be understood that any suitable alternative transmitter capable of single side-band transmission is contemplated.

Referring to FIG. 2, the encoder 40 includes a fixed frequency first oscillator 50 in which is provided an NPN transistor 51 having its emitter coupled through a resistor 52 to ground reference potential, the base of the transistor 51 being coupled through a resistor 53 back to ground reference potential and by a resistor 54 to the B+ supply voltage. A pair of serially connected capacitors 55 and 56 are coupled between the collector of the transistor 51 and the B+ supply voltage, the juncture of the capacitors 55 and 56 being coupled to the emitter of the transistor 51. An inductor 57 (which can, of course, be adjustable) is coupled between the collector of the transistor 51 and the B+ supply voltage, so as effectively to be in parallel with the capacitors 55 and 56. The oscillator 50 will produce a signal at a frequency determined fundamentally by the value of the capacitors 55 and 56 and the inductor 57. The output of the oscillator 50 appears on the emitter of the transistor 51 and is coupled by way of a capacitor 59 to an amplifier 60. The amplified oscillatory signal is coupled through a capacitor 61 and appears across a potentiometer 62. The movable arm of the potentiometer 62 is coupled by way of a capacitor 63 to a resistor 64. The potentiometer 62 can be adjusted to provide a selected amplitude of the oscillatory signal across the resistor 64.

The encoder 40 also includes a variable frequency second oscillator 70 which includes an NPN transistor 71 having its emitter coupled through a resistor 72 to ground reference potential, the base of the transistor 71 being coupled through a resistor 73 to ground reference potential and a resistor 74 to the B+ supply voltage. A pair of serially connected capacitors 75 and 76 are coupled between the collector of the transistor 71 and the B+ supply voltage, the juncture of the capacitors 75 and 76 being coupled to the emitter of the transistor 71. An inductor 77 is coupled between the collector of the transistor 71 and the B+ supply voltage so as to be effectively in parallel with the capacitors 75 and 76. The inductor 77 has ten taps 77.1–77.10, only certain of the taps having been labeled for convenience. The oscillator 70 includes a rotary switch 78 having a movable contact connected to the B+ supply voltage and ten stationary contacts respectively coupled to the taps 77.1–77.10 on the inductor 77.

In operation, the movable arm of the switch 78 may be moved to engage a selected fixed contact thereof, whereupon a path is completed from the B+ supply voltage through the portion of the inductor between the selected tap and the "bottom" of the inductor 77. The frequency of the oscillatory signal produced by the oscillator 70 will be determined fundamentally by the values of the selected portion of the inductor 77 and the capacitors 75 and 76. Thus the oscillator 70 can be adjusted to produce a signal having one of ten different frequencies. The signal which appears on the emitter of the transistor 71 is coupled by way of a capacitor 79 to an amplifier 80 in which the signal is amplified. The amplified oscillatory signal is coupled by way of a capacitor 81 to appear across a potentiometer 82. The movable arm of the potentiometer 82 is coupled through a capacitor 83 so that the amplified oscillatory signal appears across a resistor 84. The potentiometer 82 is adjusted to provide a selected amplitude of the oscillatory signal across the resistor 84. (A similar adjustment is made with respect to the potentiometer 62.)

The encoder 40 further comprises a switch 90 having a movable contact 91 and a pair of stationary contacts 92 and 93. The stationary contact 92 is coupled to the juncture of the capacitor 63 and the resistor 64, while the contact 93 is coupled to the juncture of the capacitor 83 and the resistor 84. The movable contact 91 is coupled as one input to a multiplier 94, the second input of the multiplier 94 being coupled to the juncture of the capacitor 83 and the resistor 84. The multiplier 94 functions to multiply the signals appearing at the two inputs thereto and provides one tone having a frequency equal to the sum of the frequencies of the input signals and a second tone having a frequency equal to the difference in frequency of the input signals. An example of a multiplier which has been used in the system is a device called a four-quadrant multiplier, No. 8,013 made by Intersil, Inc. of 10,900 N. Tantau Avenue, Cupertino, California 95,014, and described in an application bulletin A011, dated June, 1972.

The switch 90 is shown in its first position where the movable contact 91 is engaged with the stationary contact 92, so that the first input to the multiplier 94 is the fixed frequency oscillatory signal from the oscillator 50 and the second input to the multiplier 94 is a signal from the oscillator 70 having a selected frequency. The output of the multiplier 94 has two components, a first tone having a frequency equal to the sum of the frequencies of the signals from the oscillators 50 and 70 and a second tone having a frequency equal to the frequency difference between those signals. If the switch 90 is placed in its second position so that the movable contact 91 engages the fixed contact 93, both inputs to the multiplier 94 will be the signal from the oscillator 70. In this case the multiplier 94 produces but a single tone having a frequency equal to twice the frequency of the signal from the oscillator 70 (the difference frequency signal has a frequency equal to zero).

The output of the multiplier 94 is amplified in an amplifier 95, then coupled across a potentiometer 96. The movable arm of potentiometer 96 provides the output of the encoder 40 and is coupled to the audio amplifier 21 (FIG. 1). The potentiometer 96 is adjusted to apply the desired amplitude of the tone or tones, as the case may be, to the audio amplifier 21. The transmitter 20 processes the simultaneous tones as previously described so that the antenna 30 will radiate a single side-band RF wave including modulation components representing the two simultaneous tones. The difference of frequency between the two tones will activate a specific receiver as will be presently described. Thus, if the operator of the transmitter 20 wishes to communicate with a certain receiver responsive to a difference frequency of 800 Hz, for example, and the oscillator 50 produces a signal at a fixed frequency of 1,500 Hz., he will set the switch 78 in the oscillator 70 so that it produces a signal having a frequency of 400 Hz. In that case the encoder 40 will produce two tones, one having a frequency of 1,900 Hz. (1,500 + 400) and the second tone having a frequency of 1,100 Hz. (1,500 − 400). The difference in frequency between the two tones is 800 Hz. (1,900 − 1,100) and therefore will activate the specific receiver. The operator then activates the push-to-talk switch (not shown) which causes the two tones to be simultaneously impressed upon the balanced modulator 22. The tones, after being modulated on a single side-band, are transmitted to actuate the selected receiver. Since the tones are only sent for a very short duration of a few hundred milliseconds or less, the operator may begin speaking into the microphone 24 almost immediately, which voice message is transmitted via modulation components on the single side-band. Thus, the RF wave radiated by the antenna 30 consists of a pair of simultaneous tones to activate the receiver in question followed by the intelligence message.

Figure 3:
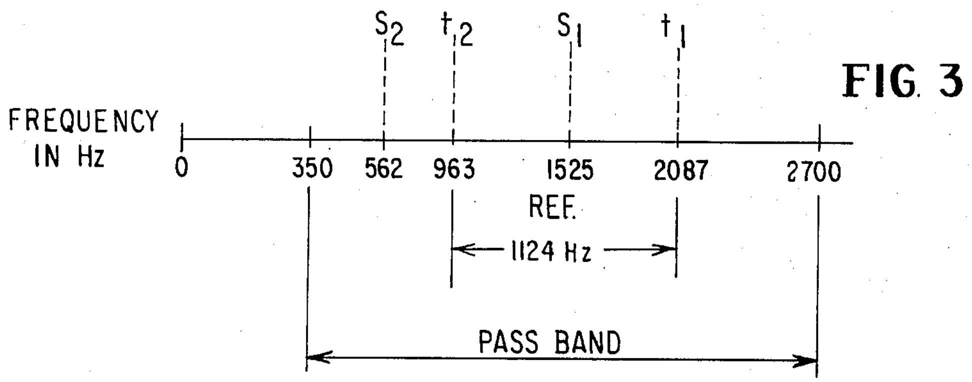
FIG. 3 is a diagram illustrating the frequency relationship of the various tones and signals of an exemplary system.

Referring now to FIG. 3, an example of the encoder 40 will be described. Because of the construction of the selective call communications system including the transmitter 20 and the various receivers with which it is to communicate, the pass band need not be greater than the voice spectrum, which may be assumed to be 350 Hz. to 2,700 Hz. as is shown in FIG. 3. The signal $s_1$ produced by the first oscillator 50 has a frequency of 1,525 Hz. This frequency is fixed and is at the center frequency of the pass band. The frequency of the signal $s_2$ produced by the oscillator 70 is variable, but in the example is assumed to be 562 Hz. When the signals $s_1$ and $s_2$ are mixed by the multiplier 94, a first tone $t_1$ is provided which has a frequency equal to the sum of the frequencies of the signals $s_1$ and $s_2$, or 2,087 Hz. A second tone $t_2$ is also generated having a frequency equal to the difference between the frequencies of the signals $s_1$ and $s_2$, or 963 Hz. The tones $t_1$ and $t_2$ are transmitted as modulation components and will activate a receiver in which the decoder is responsive to a difference frequency signal of 1,124 Hz. (the difference in frequency between the tones $t_1$ and $t_2$, 2,087 Hz. – 963 Hz.). It will be noted that the frequency of the signal $s_2$ produced by the oscillator 70 is ½ the decoder frequency. Thus, if the operator wishes to communicate with a receiver having a 1,000 Hz. decoder, the oscillator 70 is set to produce a signal $s_2$ having a frequency of 500 Hz. It is important to note that the frequencies $t_1$ and $t_2$ are all within the pass band of the single side-band system. This is important in order to achieve maximum utilization of the available spectrum. This will be accomplished as long as the frequency of the signal $s_2$ is less than 1,175 Hz. (1,525 Hz. – 350 Hz.). Then, the entire voice message and the tones are within the voice spectrum of 350 Hz. to 2,700 Hz. Also, the fixed frequency of the signal $s_1$ produced by the oscillator 50 has a fixed value at the center of the pass band which, in the example of FIG. 3, is 1,525 Hz.

Thus, with the switch 90 in the first position illustrated in FIG. 2, the encoder 40 is in condition to produce a pair of simultaneous tones suitable for use in a single side band system.

By placing the switch 90 in its other position, the encoder 40 may be utilized to furnish a single tone for use in a standard AM or FM system. The multiplier 94 will produce a tone having a frequency twice the frequency of the signal produced by the oscillator 70. If the oscillator 70 is set to produce a signal $s_2$ having a frequency of 562 Hz., for example, the multiplier 94 will produce a tone having a frequency of 1,124 Hz. The tone is modulated onto the output wave of the transmitter and applied to the AM or FM receiver as the case may be. Of course the same decoder in the receiver may be used whether the RF signals are AM, FM or single side-band. Whether AM or FM on the one hand or single side-band on the other, the decoder is responsive to precisely the same tone. In the single side-band mode, the modulation components consist of a pair of simultaneous tones spaced by 1,124 Hz., for example, so as to activate a single side band receiver having an 1,124 Hz. decoder; and in the case of the AM or FM system, the modulation components include a single tone of 1,124 Hz. which will activate an AM or FM receiver, as the case may be, having the same 1,124 Hz. decoder.

Thus, with this system the ten possible signals produced by the oscillator 70 can be used to operate ten different receivers whether they are single side band on the one hand or AM or FM on the other, and only ten different decoders would be required. Also, none of the parts of the encoder have to be changed to switch from single side band to AM or FM.

A most important advantage of the transmitter 20 in its single side-band mode, is that it maximizes the possible drift of the tones during tansmission without affecting its capability to activate the selected receiver. This results because the fixed frequency signal $s_1$ has a frequency in the center of the pass band. If the selected decoding signal is to have a frequency of 400 Hz., the two tones have frequencies of 1,325 Hz. (1,525 – 400/2) and 1,725 Hz. (1,525 + 400/2). Both tones are as close as possible to the center of the pass band and even if they both drifted several hundred cycles, they would remain in the pass band and the difference between them would be maintained at 400 Hz.

Figure 4:
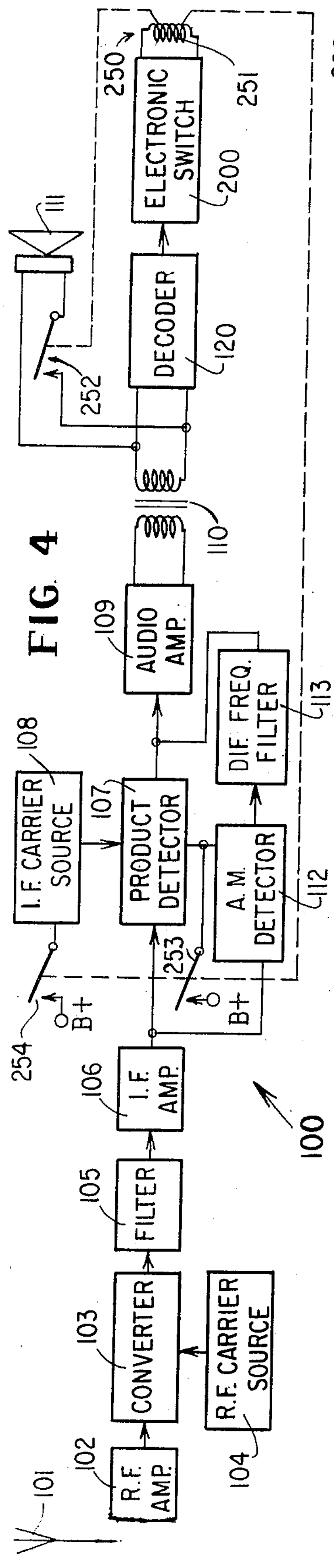
FIG. 4 is a block diagram of a receiver which is utilized in the selective calling communication system.

Turning now to FIG. 4, there will be described the details of construction of a receiver used in the communication system incorporating the features of the present invention. The receiver 100 includes an antenna 101 which receives the signals emitted by the transmitter 20 and applies them to an RF amplifier 102. The amplified signals are applied to a converter 103 having a second input coupled to an RF carrier source 104. The RF signals from the amplifier 102 are mixed with the RF carrier from the source 104 to provide an output signal at the difference frequency. This output signal is filtered by a filter 105, and is applied as an IF signal to an IF amplifier 106. The output of the amplifier 106 is coupled to a product detector 107 of standard construction, the latter receiving a second input from an IF carrier source 108. The source 108 reinserts the IF carrier which was suppressed at the transmitter 20, in order to detect the modulation components and apply them to an audio amplifier 109. Thus, the input to the audio amplifier 109 will consist of a pair of simultaneous tones followed by the voice message. The output of the amplifier 109 is coupled by way of a transformer 110 to a loudspeaker 111.

The IF signal from the IF amplifier 106 is also coupled to an AM detector 112 of standard construction, which detects the IF components which include the simultaneous tones. The output of the AM detector includes one signal having a frequency equal to the sum of the two tones, and another signal having a frequency equal to the difference between the two tones. A filter 113 coupled to the output of the AM detector is constructed to pass only the difference frequency signal and to reject the signal having a frequency equal to the sum of the tones and any other signals which may be generated in the detector 112. The output of the difference frequency filter 113 is applied to the audio amplifier 109 wherein the output is amplified and applied across the transformer 110 to a decoder 120 which will provide an output if the signal applied thereto is of a frequency to which the decoder 120 is tuned. The output of the decoder 120 is applied to an electronic switch 200 which, in the presence of a signal from the decoder 120, will furnish an enabling current through the winding 251 of a relay 250. The relay 250 includes a first pair of contacts 252, a second pair of contacts 253, and a third pair of contacts 254 all of which are closed in the presence of an enabling current from the electronic switch 200 and are opened in the absence of such enabling current.

Figure 5:
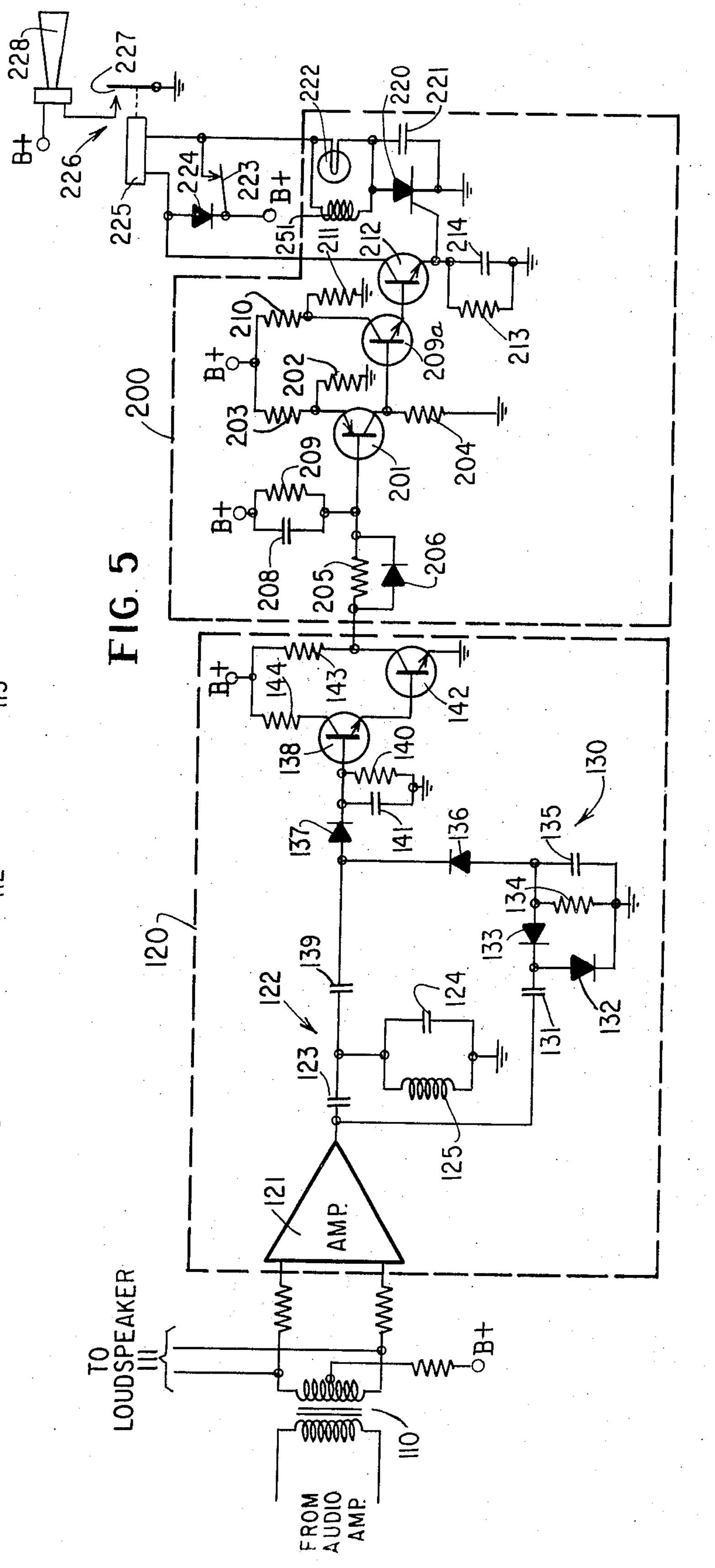
FIG. 5 is a diagram partially in block and partially in schematic illustrating specifics of the decoder and electronic switch of FIG. 4.

Turning now to FIG. 5, the details of the decoder 120 in the electronic switch 200 will be described. The output of the transformer 110 is coupled to an amplifier 121 to amplify further the audio signals. The output of the amplifier 121 is coupled to a tone filter 122 which includes capacitors 123 and 124 coupled in series to ground reference potential and an inductor 125 coupled in parallel with the capacitor 124. The decoder 120 further comprises a reference circuit 130 including an input capacitor 131 coupled to the output of the amplifier 121 and a diode 132 coupled to ground. There is also provided a diode 133 connected to the junction of the capacitor 131 and the diode 132. A filtering network comprising a resistor 134 and a capacitor 135 coupled in parallel is connected between the anode of the diode 133 and ground reference potential. A rectifying circuit including a pair of diodes 136 and 137 is coupled in series from the anode of the diode 133 to the base of an NPN switching transistor 138. A capacitor 139 is coupled from the junction of the capacitors 123 and 124 to the junction of the diodes 136 and 137. There is also provided a resistor 140 and a capacitor 141 coupled in parallel between the cathode of the diode 137 and ground, for filtering the rectified voltage. The resistor 140 also provides a DC return for the base of the transistor 138. The transistor 138 is connected as an emitter follower, the emitter thereof being coupled to the base of an NPN transistor 142. The emitter of the transistor 142 is coupled to ground and the collector is coupled by way of a resistor 143 to the B+ supply voltage. The collector of the transistor 138 is coupled by way of a resistor 144 to the B+ supply voltage.

A tone furnished by the audio amplifier 109 is further amplified in the amplifier 121 which has sufficient gain to cause the tone to be clipped or limited so that the signal strength at the antenna 101 does not affect the amplitude of the signal applied to the filter 122. The amplified signal from the amplifier 121 containing the tone and noise will be filtered in the reference circuit 130 and will be rectified thereby to provide a reference voltage on the anode of the diode 136. If the signal from the amplifier 121 includes the tone to which the filter 122 is tuned, the filter 122 will develop its maximum voltage which is applied to the cathode of the diode 136. In order that the diode 136 may conduct to provide an output, the tone appearing at the cathode thereof must have a peak-to-peak value in excess of the reference voltage on the anode of the diode 136. The rectified voltage, after being filtered by the resistor 140 and the capacitor 141, is applied to the base of the transistor 138 to render it conductive. Current from the B+ supply voltage flows through the collector and emitter of the transistor 138 and the base-emitter junction of the transistor 142. Sufficient current flows to saturate the transistor 142 and cause the collector thereof to drop close to ground reference potential. Thus, if the frequency of the tone is that to which the decoder 120 is tuned, the collector of the transistor 142 will be effectively grounded. When no tone or the incorrect tone is received, the collector of the transistor 142 will remain essentially at the B+ supply voltage.

The electronic switch 200 in the embodiment shown is a monostable multivibrator and includes a PNP transistor 201 having its emitter coupled to a resistor 202 to ground and a resistor 203 to the B+ supply voltage. A load resistor 204 couples the collector of the transistor to ground reference potential. The base of the transistor 201 is coupled by way of a resistor 205 to the collector of the transistor 142 in the decoder 120. Across the resistor 205 is a diode 206. A time constant circuit includes a capacitor 208 and a resistor 209 coupled in parallel between the B+ supply voltage and the base of the transistor 201. The collector of the transistor 201 is coupled to the base of an NPN transistor 209*a*, the collector of which is coupled through a resistor 210 to the B+ supply voltage and through a resistor 211 to ground reference potential. The transistor 209*a* is connected as an emitter follower, the emitter being coupled to the base of yet a third transistor 212, the emitter of which is coupled to ground via a resistor 213, there being provided a filtering capacitor 214 across the resistor 213. The emitter of the transistor 212 is coupled to the control electrode of an SCR 220, the cathode of which is coupled to ground. A capacitor 221 is coupled between the anode and the cathode of the SCR 220. A light bulb 222 and a normally-closed switch 223 are coupled in series between the SCR 220 and the B+ supply voltage. The winding 251 of the relay 250 is coupled in parallel with the bulb 222. The series combination of a diode 224 and the winding 225 of a relay 226 is coupled in parallel with the switch 223. The relay 226 includes two contacts 227 respectively coupled to ground and to one terminal of the horn 228 of a vehicle, the other terminal being coupled to the B+ supply voltage.

In operation, the appearance of the correct tone at the input to the decoder 120 effectively grounds the collector of the transistor 142 to enable current to flow from the B+ supply voltage through the resistor 203, through the base-emitter junction of the transistor 201, the resistor 205, and through the collector and the emitter of the transistor 142 to ground. Thus, the transistor 201 conducts causing current to flow from the B+ supply voltage through the resistor 203, the collector and the emitter of the transistor 201, the base-emitter junction of the transistor 209*a*, the base-emitter junction of the transistor 212, and through the resistor 213 to ground, causing the transistors 209*a* and 212 to conduct. The transistor 212 becomes saturated to complete a path from the B+ supply voltage through the switch 223, the winding 225 of the relay 226, the collector and emitter of the transistor 212 and the parallel combination of the resistor 213 and the capacitor 214, to ground. The resultant increase in potential on the emitter of the transistor 212 is applied to the control electrode of the SCR 220 causing it to conduct and thereby complete a path for current flow from the B+ supply voltage through the switch 223, the lamp 222, the SCR 220 and the relay winding 251 of the relay 250.

The current flow through the bulb 222 illuminates it and thereby alerts the user of the receiver 100 that he is being called. Once a voltage is applied to the control electrode of the SCR 220, it remains conductive even though the voltage is later removed. Thus, the termination of the tone applied to the decoder 120 a few hundred milliseconds after it commences because of the termination of the simultaneous tones in the incoming signal, has no effect on the conduction of the SCR 220. It continues to conduct so that the bulb 222 is illuminated and the relay 250 is energized indefinitely following termination of the tones. The switch 223 constitutes a reset means, whereby the path for current flow through the SCR 220 is interrupted if the switch 223 is opened. When opened, therefore the switch 223 causes the bulb 222 to be extinguished and the relay 250 to be deenergized.

The presence of the proper tone to the decoder 120 causes current to flow through the winding 225 of the relay 226, thereby energizing the contacts 227 to cause the horn 228 to sound. However, the duration that the horn 228 is operative is not indefinite. The saturation of the transistor 142 in response to the correct tone caused the capacitor 208 to charge quickly. At termination of the tone, the impedance between the collector and the emitter of the transistor 142 again increases, but because of the charge in the capacitor 208, the transistor 201 continues to conduct as does the transistor 212 to maintain the horn 228 operative.

However, when the tones terminate the capacitor 208 commences to discharge at a rate determined by the value of the capacitor 208 and the resistor 143, 205 and 209. After a predetermined time, the capacitor 208 has sufficiently discharged to render non-conductive the transistor 201 and thus the transistor 212. At that time, current flow through the relay 226 ceases and the horn 228 ceases to operate.

Thus, the presence of the proper pair of simultaneous tones in the incoming wave causes the bulb 222 to become illuminated indefinitely until the operator operates the switch 223 and causes the horn 228 to operate for a short period of time to alert the user initially.

Energization of the relay 251 causes the contacts 252, 253 and 254 to close indefinitely, until the switch 223 is opened. Closure of the first pair of contacts 252 upon receipt of the correct pair of tones completes the path to the loudspeaker 111 whereupon the ensuing intelligence message can be applied to the loudspeaker 111 which converts it into sound waves. Closure of the second pair of contacts 253 causes B+ to be applied to the product detector 107 and to the AM detector 112. The B+ voltage renders the product detector 107 operative and at the same time renders the AM detector 112 inoperative. The third pair of contacts 254 couples the B+ voltage to the IF carrier source 108, thereby rendering such source operative. When the contacts 253 are open, the B+ supply voltage is isolated from the product detector 107 whereby it is inoperative, and the B+ supply voltage is isolated from the AM detector 112 whereby it is operative. The B+ supply voltage is isolated from the IF carrier source 108 when the contacts 254 are open so as to render the same inoperative.

In operation, when an incoming wave is applied to the receiver, the elements 101 to 106 receive the incoming wave and provide an IF signal including single side-band components corresponding to the two simultaneous tones which were in the incoming wave and the intelligence message also in the incoming wave. The contacts 254 are open at this time, so that the IF carrier source 108 is inoperative and thus does not produce an IF carrier wave. Similarly, the contacts 253 are open, so that the product detector 107 is inoperative. The AM detector 112, on the other hand, is operative to mix the single side-band components in the IF signal from the IF amplifier 106 to provide a sum frequency signal and a difference frequency signal, the latter constituting the tone. The filter 113 passes only the tone to the audio amplifier 109, which tone is amplified and coupled to the decoder 120. For example, if the IF frequency is 455 Khz, and one transmitted tone has a frequency of 2,087 Hz. and the other transmitted tone has a frequency of 963 Hz., the IF signal will include components at 457.087 Khz. and at 455.963 Khz. (assuming that the receiver is receiving the upper side band). When the components are detected, there will result a sum frequency signal having a frequency of 913.050 Khz and a difference frequency signal or tone having a frequency of 1,124 Hz. The filter 113 will pass only the 1,124 Hz. tone and reject the 913.050 Khz. signal.

If the frequency of the tone corresponds to the frequency to which the decoder 120 is tuned, the electronic switch 200 will be operated to energize the winding 251 of the relay 250. It will be remembered that the winding 251 remains energized indefinitely until the switch 223 is reset. The energization of the winding 251 closes the contacts 252, so that any subsequent signals appearing at the secondary of the transformer 110 will be applied to the speaker 111 for conversion into sound waves, thereby unsquelching the receiver 100. Also, the closure of the contacts 253 deactivates the AM detector 112 and activates the product detector 107. The closure of the contacts 254 energizes the IF carrier source 108.

After the tones in the IF signal terminate, the voice message commences. Because both the IF carrier source 108 and the product detector 107 are operative, the intelligence message in the IF signal will be detected and applied for further amplification by the amplifier 109. The amplified intelligence message is coupled to the loudspeaker 111 by virtue of the contacts 252 being closed.

As previously pointed out, the signals produced by the oscillators 50 and 70 in the transmitter 20 and the tones produced by the multiplier 94 have frequencies within the voice spectrum, that is, within the range of about 350 Hz. to 2,700 Hz. in the example discussed. This is desirable, first to minimize the portion of the frequency spectrum required by any individual communication system. Because the tone frequencies are within the voice spectrum, the extent of the frequency spectrum is minimized. Secondly, utilizing tones only within the voice spectrum narrows the pass band to which the receiver 100 must respond. Basically, the narrower the pass band of the receiver, the better the signal-to-noise ratio thereof.

The capability of providing both the tones and the intelligence message within the voice spectrum is achieved in part because the electronic switch 200 furnishes an enabling signal after the tones have terminated. Also, by rendering the product detector 107 and the IF carrier source 108 inoperative during the reception of tones, extraneous information for application to the decoder 120 is precluded. Also, after the tones have terminated and the voice message commences, the deenergization of the AM detector 112 renders it incapable of providing extraneous information which would be reproduced by loudspeaker 111 most likely in the form of noise and other undesirable sounds. By rendering each detector operative only during the time when it is needed, the same amplification channel, in the form of the audio amplifier 109, can be used for each. Thus, while the product detector 107 is operative to detect the intelligence message, the audio amplifier 109 is able to amplify such message. On the other hand, during that time the AM detector 112 is to produce the tone necessary to activate the loudspeaker circuit, the audio amplifier 109 can amplify the tones.

Although the communication system has been described as one in which the decoders are responsive to a single tone, it is to be understood that the principles of the invention are equally applicable to systems in which the decoders in the various receivers are responsive to a sequence of two or more tones. In the case of single side-band operation, a sequence of pairs of simultaneous tones would be provided.

It should be understood that while disabling and enabling of the detectors has been shown to be effected by selective coupling of a B+ voltage, there are other ways in which a similar operation can be accomplished. For example, the outputs of the detectors can be selectively coupled to the audio amplifier.

It is believed that the invention, its mode of construction and assembly, and many of its advantages should be readily understood from the foregoing without further description, and it should also be manifest that, while a preferred embodiment of the invention has been shown and described for illustrative purposes, the structural details, are nevertheless, capable of wide variation within the purview of the invention, as defined in the appended claims.

I claim:

1. A tone generator for use in a selective call transmitter having an associated pass band, said tone generator comprising fixed frequency first oscillator means for producing a first signal of a fixed frequency approximately centered in the pass band, variable frequency second oscillator means for producing a second signal having a frequency within a range defined substantially by the lowest frequency of the pass band and the center frequency minus such lowest frequency, and multiplier means having first and second inputs respectively coupled to said first and second oscillator means for producing first and second tones having frequencies in the pass band and respectively equal to the sum of and difference between the frequencies of said first and second signals.

2. The tone generator set forth in claim 1, wherein the fixed frequency of said first signal is about 1,525 Hz.

3. The tone generator set forth in claim 1, wherein the frequency of said second signal is within the range of about 350 Hz. to 1,175 Hz.

4. A tone generator for use in a selective call transmitter having an associated pass band, said tone generator comprising fixed frequency first oscillator means for producing a first signal of a fixed frequency approximately centered in the pass band, variable frequency second oscillator means for producing a second signal having a selected frequency within a range defined substantially by the lowest frequency of the pass band and the center frequency minus such lowest frequency, multiplier means having first and second inputs for multiplying two signals respectively applied thereto, and switching means having a first position coupling said first oscillator means to said first input of said multiplier means and having a second position coupling said second oscillator means to said first input, said second input of said multiplier means being coupled to said second oscillator means, whereby said multiplier produces first and second tones having frequencies in the pass band and respectively equal to the sum of and difference between the frequencies of said first and second signals when said switching means is in the first position thereof, and whereby said multiplier means produces a single tone having a frequency equal to twice the frequency of said second signal when said switching means is in the second position thereof.

5. The tone generator set forth in claim 4, wherein said switching means is a manual switch.

* * * * *